(12) United States Patent
Kondo

(10) Patent No.: US 9,263,931 B2
(45) Date of Patent: Feb. 16, 2016

(54) LINEAR SOLENOID AND MANUFACTURING METHOD OF THE SAME

(71) Applicant: DENSO CORPORATION, Kariya, Aichi-pref. (JP)

(72) Inventor: Jiro Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/486,247

(22) Filed: Sep. 15, 2014

(65) Prior Publication Data

US 2015/0076930 A1 Mar. 19, 2015

(30) Foreign Application Priority Data

Sep. 19, 2013 (JP) .................................. 2013-193686

(51) Int. Cl.
| | | |
|---|---|---|
| *H01F 7/16* | (2006.01) | |
| *H02K 41/035* | (2006.01) | |
| *B29C 45/14* | (2006.01) | |
| *H02N 1/00* | (2006.01) | |

(Continued)

(52) U.S. Cl.
CPC ........ *H02K 41/035* (2013.01); *B29C 45/14065* (2013.01); *B29C 45/14467* (2013.01); *B29C 45/14491* (2013.01); *H01F 7/1607* (2013.01); *H02N 1/00* (2013.01); *B29C 2045/14131* (2013.01); *B29K 2101/00* (2013.01); *B29K 2995/0008* (2013.01); *B29L 2031/34* (2013.01); *H01F 2007/086* (2013.01); *H02K 2213/12* (2013.01)

(58) Field of Classification Search
CPC ........... H02K 41/035; B29C 45/14467; B29C 45/14065; B29C 45/14491; H02N 1/00; H01F 7/1607; H01F 2007/086

USPC .................................................. 335/220, 266
See application file for complete search history.

(56) References Cited

U.S. PATENT DOCUMENTS

| | | | | |
|---|---|---|---|---|
| 6,955,336 | B2 * | 10/2005 | Bircann et al. ..... | F02M 25/0772 251/129.15 |
| 7,209,020 | B2 * | 4/2007 | Telep .................... | H01F 7/1607 335/255 |

(Continued)

FOREIGN PATENT DOCUMENTS

| | | |
|---|---|---|
| JP | 2-76280 | 6/1990 |
| JP | 2004-153077 | 5/2004 |

(Continued)

OTHER PUBLICATIONS

Office Action (2 pages) dated Sep. 8, 2015, issued in corresponding Japanese Application No. 2014-010061 and English translation (2 pages).

(Continued)

*Primary Examiner* — Bernard Rojas
(74) *Attorney, Agent, or Firm* — Nixon & Vanderhye PC

(57) ABSTRACT

An inner diameter of a third stator core is greater than an inner diameter of a second stator core. When a first stator core, the second stator core, and the third stator core are placed in an inner periphery of a coil, a jig is inserted from an inner-periphery opening of a first end side of the third stator core into the third stator core to directly position the first stator core, the second stator core, and the third stator core in a radial direction. Therefore, a side force generated by an axis deviation between the first stator core, the second stator core, and the third stator core can be reduced.

6 Claims, 8 Drawing Sheets

(51) Int. Cl.
*H01F 7/08* (2006.01)
*B29K 101/00* (2006.01)
*B29L 31/34* (2006.01)

(56) References Cited

U.S. PATENT DOCUMENTS

| | | | | |
|---|---|---|---|---|
| 7,808,134 | B2 * | 10/2010 | Burnett et al. | F16F 13/264 123/90.16 |
| 8,136,790 | B2 * | 3/2012 | Hoppe et al. | F01L 1/34 251/129.15 |
| 8,264,312 | B2 * | 9/2012 | Hamaoka et al. | F16K 27/029 335/278 |
| 8,957,749 | B2 * | 2/2015 | Matsumoto et al. | H01F 7/1638 335/255 |
| 2004/0257185 | A1 | 12/2004 | Telep | |
| 2009/0039992 | A1 | 2/2009 | Ryuen et al. | |
| 2012/0199086 | A1 | 8/2012 | Hori et al. | |
| 2012/0242436 | A1 | 9/2012 | Murao | |

FOREIGN PATENT DOCUMENTS

| | | |
|---|---|---|
| JP | 2005-299919 | 10/2005 |
| JP | 2009-147075 | 7/2009 |

OTHER PUBLICATIONS

Office Action (3 pages) dated Jul. 14, 2015, issued in corresponding Japanese Application No. 2013-193691 and English translation (3 pages).

Office Action (2 pages) dated Jul. 14, 2015, issued in corresponding Japanese Application No. 2013-193686 and English translation (2 pages).

Kondo, U.S. Appl. No. 14/486,537, filed Sep. 15, 2014.

Office Action (7 pages) dated Oct. 28, 2015, issued in copending U.S. Appl. No. 14/486,537, filed Sep. 15, 2014 to Kondo.

* cited by examiner

AXIAL DIRECTION
FIRST END SIDE ←→ SECOND END SIDE

AXIAL DIRECTION
FIRST END SIDE ↔ SECOND END SIDE

LINEAR SOLENOID AND MANUFACTURING METHOD OF THE SAME

CROSS REFERENCE TO RELATED APPLICATION

This application is based on Japanese Patent Application No. 2013-193686 filed on Sep. 19, 2013, the disclosure of which is incorporated herein by reference.

TECHNICAL FIELD The present disclosure relates to a linear solenoid which outputs a force acting in an axial direction.

BACKGROUND

JP-2005-045217A (US 2004/0257185 A1) discloses a linear solenoid mounted to a vehicle outputs a thrust using a magnetic flux generated according to an energization of a coil.

In the linear solenoid, a movement amount of a movable core in an axial direction can be increased without increasing a size of the linear solenoid in the axial direction. The movable core includes a cylindrical portion. Stator cores are placed at positions inside of the movable core and outside of the movable core, respectively.

A better configuration of the linear solenoid according to JP-2005-045217A includes the movable core, a first stator core, a second stator core, and a third stator core, which are made of magnetic material.

The movable core includes a magnetic portion having a cylindrical shape, and is placed in an inner periphery of the coil and is movable with respect to an axial direction concentric with the coil. The first stator core is placed at a position inside of an inner periphery of the movable core, and the first stator core receives and transmits the magnetic flux in a radial direction of the movable core. The second stator core is a magnetic portion having a cylindrical shape, and is placed at a position outside of an outer periphery of the movable core such that the movable core is interposed between the first stator core and the second stator core. The second stator core receives and transmits the magnetic flux in the radial direction of the movable core. The third stator core is placed at a position such that the third stator core is not in contact with the second stator core in the axial direction. The third stator core magnetically attracts the movable core in the axial direction.

However, the first stator core, the second stator core, and the third stator core can be directly positioned in the radial direction.

According to JP-2005-045217A, a magnetic portion provided integrally with the first stator core and a magnetic portion provided integrally with the second stator core are fitted to each other to position the first stator core and the second stator core in the axial direction.

Therefore, the first stator core, the second stator core, and the third stator core is insufficiently positioned in the radial direction, and it is possible that a side force generated by an axis deviation between the first stator core, the second stator core, and the third stator core increases. In this case, the side force is an attractive force generated between the movable core, the first stator core, the second stator core, and the third stator core, in the radial direction.

SUMMARY

The present disclosure is made in view of the above matters, and it is an object of the present disclosure to provide a linear solenoid in which a movable core includes a cylindrical portion and stator cores are placed at inner and outer periphery of the cylindrical portion, so as to reduce a side force.

According to an aspect of the present disclosure, a linear solenoid outputs a thrust in an axial direction using a magnetic flux generated according to an energization of a coil. The linear solenoid includes a movable core, a first stator core, a second stator core, and a third stator core.

The movable core includes a magnetic portion having a cylindrical shape, and is placed in an inner periphery of the coil and is movable with respect to an axial direction concentric with the coil. The first stator core made of magnetic material is placed at a position inside of an inner periphery of the movable core, and the first stator core receives and transmits the magnetic flux in a radial direction of the movable core.

The second stator core is a magnetic portion having a cylindrical shape, and is placed at a position outside of an outer periphery of the movable core such that the movable core is interposed between the first stator core and the second stator core. The second stator core receives and transmits the magnetic flux in the radial direction of the movable core. The third stator core is a magnetic portion having a cylindrical shape, and is placed at a position of the first end side in the axial direction with respect to the second stator core such that the third stator core is not in contact with the second stator core. The third stator core magnetically attracts the movable core toward the first end side of the movable core into the inner periphery of the third stator core, the third stator core including an inner-periphery opening at a first end side in the axial direction where the inner-periphery opening is blocked by a cover. The third stator core has an inner diameter that is greater than an inner diameter of the second stator core.

When the first stator core, the second stator core, and the third stator core are placed in the inner periphery of the coil, a jig is inserted from an inner-periphery opening of a first end side of the third stator core into the third stator core to directly position the first stator core, the second stator core, and the third stator core in a radial direction. Therefore, a side force generated by an axis deviation between the first stator core, the second stator core, and the third stator core can be reduced. In this case, the side force is an attractive force generated between the movable core, the first stator core, the second stator core, and the third stator core, in the radial direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
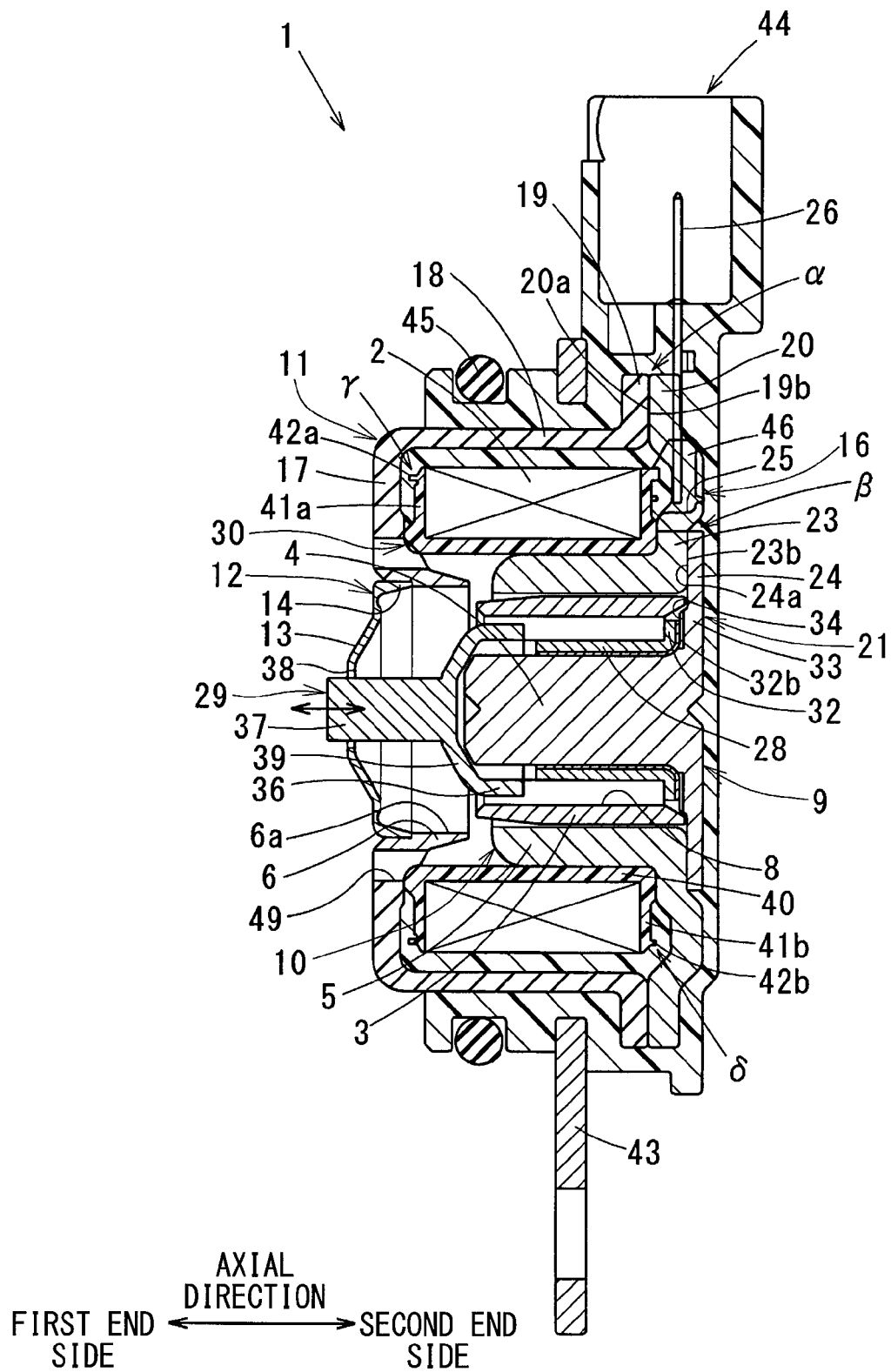
FIG. 1 is a sectional view showing a linear solenoid.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Referring to drawings, a linear solenoid 1 according to an embodiment of the present disclosure will be described.

The linear solenoid 1 generates a magnetic attractive force as a thrust using a magnetic flux generated according to an energization of a coil 2. For example, the linear solenoid 1 may be mounted to a vehicle to be applied to a supplier supplying an oil pressure of a valve-timing mechanism that changes a valve timing of an internal combustion engine.

The linear solenoid 1 includes a movable core 3, a first stator core 4, a second stator core 5, and a third stator core 6. The first stator core 4, the second stator core 5, and the third stator core 6 correspond to magnetic portions.

Figure 2A:
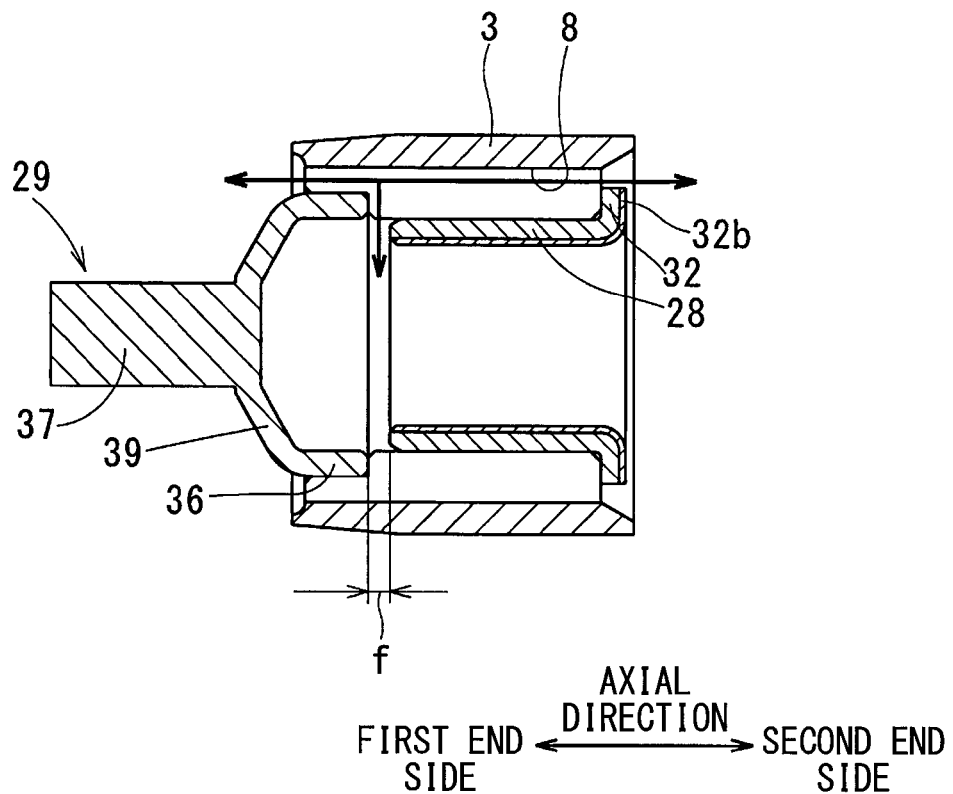
FIG. 2A is a sectional view showing a movable part of the linear solenoid.
Figure 2B:
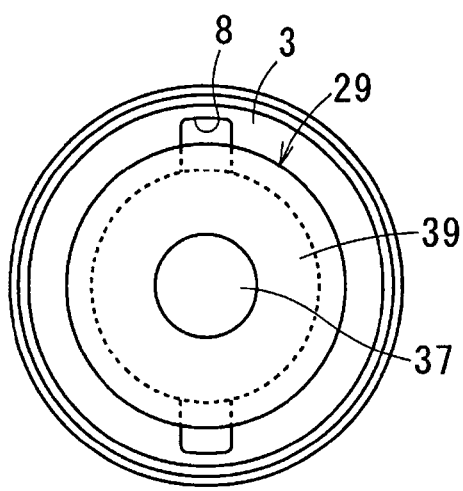
FIG. 2B is a front view showing the movable part of the linear solenoid.

The movable core 3 is a magnetic body having a cylindrical shape, and is placed in an inner periphery of the coil 2 and is movable with respect to an axial direction concentric with the coil 2. Alternatively, the movable core 3 may be a member including the magnetic body. The movable core 3 includes a first introducing passage 8 through which a fluid is introduced between a first end side of the movable core 3 and a second end side of the movable core 3 in the axial direction. As shown in FIGS. 2A and 2B, two first introducing passages 8 are provided in an inner peripheral surface of the movable core 3 at a 180-degrees interval. The first introducing passages 8 are both provided to penetrate the movable core 3 in the axial direction and correspond to grooves opened to the inner peripheral surface of the movable core 3.

The first stator core 4 having a cylindrical shape is a part of a first magnetic body 9. The first magnetic body 9 corresponds to a fixed member. The first stator core 4 is placed at a position inside of an inner periphery of the movable core 3, and slidably supports the movable core 3 in the axial direction. The first stator core 4 receives and transmits the magnetic flux in a radial direction of the movable core 3.

The second stator core 5 is having a cylindrical shape is a part of a second magnetic body 10 that is different from the first magnetic body 9. The second stator core 5 is placed at a position outside of an outer periphery of the movable core 3 such that the movable core 3 is interposed between the first stator core 4 and the second stator core 5. The second stator core 5 receives and transmits the magnetic flux in the radial direction of the movable core 3. In addition, a gap is generated between an inner peripheral surface of the second stator core 5 and an outer peripheral surface of the movable core 3. The movable core 3 slides in the axial direction without being in contact with the second stator core 5.

The third stator core 6 having a cylindrical shape is a part of a third magnetic body 11 that is different from the first magnetic body 9 and the second magnetic body 10. The third stator core 6 is concentric with the second stator core 5 and is placed at a position of the first end side in the axial direction with respect to the second stator core 5 such that the third stator core 6 is not in contact with the second stator core 5. The third stator core 6 magnetically attracts the movable core 3 toward the first end side of the movable core 3 into an inner periphery of the third stator core 6.

A cover 12 is provided to block an inner-periphery opening of a first end side of the third stator core 6 in the axial direction. The cover 12 is different from the first magnetic body 9, the second magnetic body 10, and the third magnetic body 11. The first end side of the third stator core 6 is opposite to a second end side of the third stator core 6 where the second stator core 5 is placed. The cover 12 prevents a foreign matter from entering the linear solenoid 1 from external. The cover 12 includes a cover portion 13 having an angled shape such as an umbrella, and the cover portion 13 is placed at a first end side of the cover 12 in the axial direction to prevent the foreign matter from entering the linear solenoid 1 from external. The cover 12 further includes a first cylindrical portion 14 which is pressed into the inner periphery of the third stator core 6. An area for receiving and transmitting the magnetic flux increases according to the first cylindrical portion 14.

Figure 3:
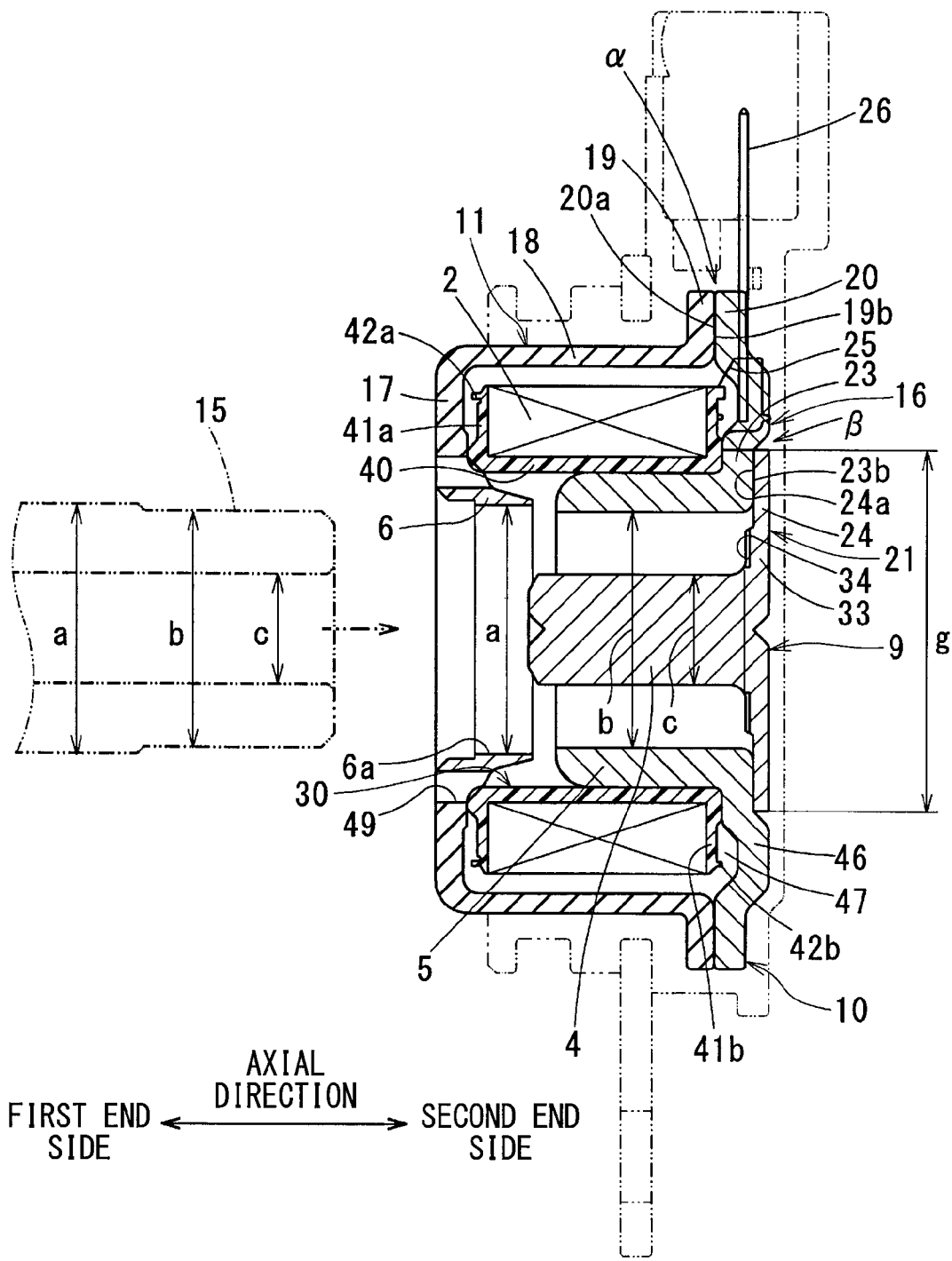
FIG. 3 is a sectional view showing a fixed part of the linear solenoid before being molded.

As shown in FIG. 3, in the linear solenoid 1, an inner diameter a of the third stator core 6 is greater than an inner diameter b of the second stator core 5. The inner diameter a and the inner diameter b are greater than an outer diameter c of the first stator core 4. When the first stator core 4, the second stator core 5, and the third stator core 6 are placed in the inner periphery of the coil 2, a jig 15 is inserted from the inner-periphery opening of the first end side of the third stator core 6 into the third stator core 6 to directly position the first stator core 4, the second stator core 5, and the third stator core 6 in the radial direction.

The linear solenoid 1 further includes a first receiving and transmitting mechanism (first R/T mechanism) α and a second R/T mechanism β.

The first R/T mechanism α makes a magnetic portion of the second magnetic body 10 different from the second stator core 5 be in contact with a magnetic portion of the third magnetic body 11 different from the third stator core 6, so as to receives and transmits the magnetic flux between the magnetic portion of the second magnetic body 10 and the magnetic portion of the third magnetic body 11.

The second magnetic body 10 includes a second end yoke 16 having a ring-plate shape. The second end yoke 16 outwardly extends from a second end side of the second stator core 5 and covers a second end side of the coil 2, in the axial direction. The third magnetic body 11 includes a first end yoke 17 having a ring-plate shape, and an outer yoke 18. The first end yoke 17 outwardly extends from the first end side of the third stator core 6 and covers a first end side of the coil 2, in the axial direction. The outer yoke 18 having a cylindrical shape extends from an outer periphery of the first end yoke 17 toward a second end side of the axial direction and covers the coil 2. The third magnetic body 11 further includes a first flange portion 19. The first flange portion 19 having a ring-plate shape outwardly extends from a second end side of the outer yoke 18 in the axial direction.

The second end yoke 16 includes a first outer-periphery portion 20 which is in surface contact with the first flange portion 19 according to the first R/T mechanism α. Therefore, the magnetic flux is received and transmitted between the first outer-periphery portion 20 and the first flange portion 19.

The second end yoke 16 extends to a position outside of an outer periphery of the coil 2, and the first outer-periphery portion 20 is placed at a position outside of the outer periphery of the coil 2. The first outer-periphery portion 20 includes a first outer-periphery surface 20a at a first end side of the first outer-periphery portion 20. The first outer-periphery surface 20a is a surface perpendicular to the axial direction. The first flange portion 19 includes a flange surface 19b at a second end side of the first flange portion 19. The flange surface 19b is a surface perpendicular to the axial direction.

Since the first outer-periphery surface 20a and the flange surface 19b are in surface contact with each other, the magnetic flux is received and transmitted between the second magnetic body 10 and the third magnetic body 11, outside of the coil 2.

In addition, since the first flange portion 19 and the first outer-periphery portion 20 are not fitted to each other by a male-female fitting, the first flange portion 19 and the first outer-periphery portion 20 can relatively move with respect to each other in the radial direction in a case where the jig 15 positions the second magnetic body 10 and the third magnetic body 11.

The second R/T mechanism β makes a magnetic portion of the first magnetic body 9 different from the first stator core 4 be in contact with a magnetic portion of the second magnetic body 10 different from the second stator core 5, so as to receives and transmits the magnetic flux between the magnetic portion of the first magnetic body 9 and the magnetic portion of the second magnetic body 10.

The first magnetic body 9 includes a second flange portion 21. The second flange portion 21 having a ring-plate shape outwardly extends from a second end side of the first stator core 4 in the axial direction.

The second end yoke 16 further includes a first inner-periphery portion 23 which is in surface contact with a second outer-periphery portion 24 of the second flange portion 21 according to the second R/T mechanism β. Therefore, the magnetic flux is received and transmitted between the first inner-periphery portion 23 and the second outer-periphery portion 24.

The second flange portion 21 extends to a position outside of the outer periphery of the movable core 3, and the second outer-periphery portion 24 is placed at a position outside of the outer periphery of the movable core 3. The first inner-periphery portion 23 includes an inner-periphery surface 23b at a second end side of the first inner-periphery portion 23. The inner-periphery surface 23b is a surface perpendicular to the axial direction. The second outer-periphery portion 24 includes a second outer-periphery surface 24a at a first end side of the second outer-periphery portion 24. The second outer-periphery surface 24a is a surface perpendicular to the axial direction.

Since the second outer-periphery surface 24a and the inner-periphery surface 23b are in surface contact with each other, the magnetic flux is received and transmitted between the first magnetic body 9 and the second magnetic body 10, at a position adjacent to the second end side of the coil 2.

In addition, since the first inner-periphery portion 23 and the second outer-periphery portion 24 are not fitted to each other by a male-female fitting, the first inner-periphery portion 23 and the second outer-periphery portion 24 can relatively move with respect to each other in the radial direction in a case where the jig 15 positions the first magnetic body 9 and the second magnetic body 10.

The first R/T mechanism α is placed at a first end side of the axial direction of the second R/T mechanism β.

The linear solenoid 1 further includes a notch portion 25 which penetrates the second end yoke 16 in the axial direction. The coil 2 includes a terminal 26 extends from the notch portion 25. The first R/T mechanism α is placed at the first end side of the terminal 26.

The linear solenoid 1 further includes a bearing 28, an output member 29, and a bobbin 30.

The bearing 28 is fixed to the inner periphery of the movable core 3 and directly slides with respect to the first stator core 4. The movable core 3 indirectly slides with respect to the first stator core 4 via the bearing 28. The bearing 28 includes an outer-periphery part that is made of magnetic material, and an inner-periphery part that is made of non-magnetic material. The bearing 28 further includes an inner periphery surface that is made of non-magnetic material and is directly in contact with an outer periphery surface of the first stator core 4.

Figure 4:
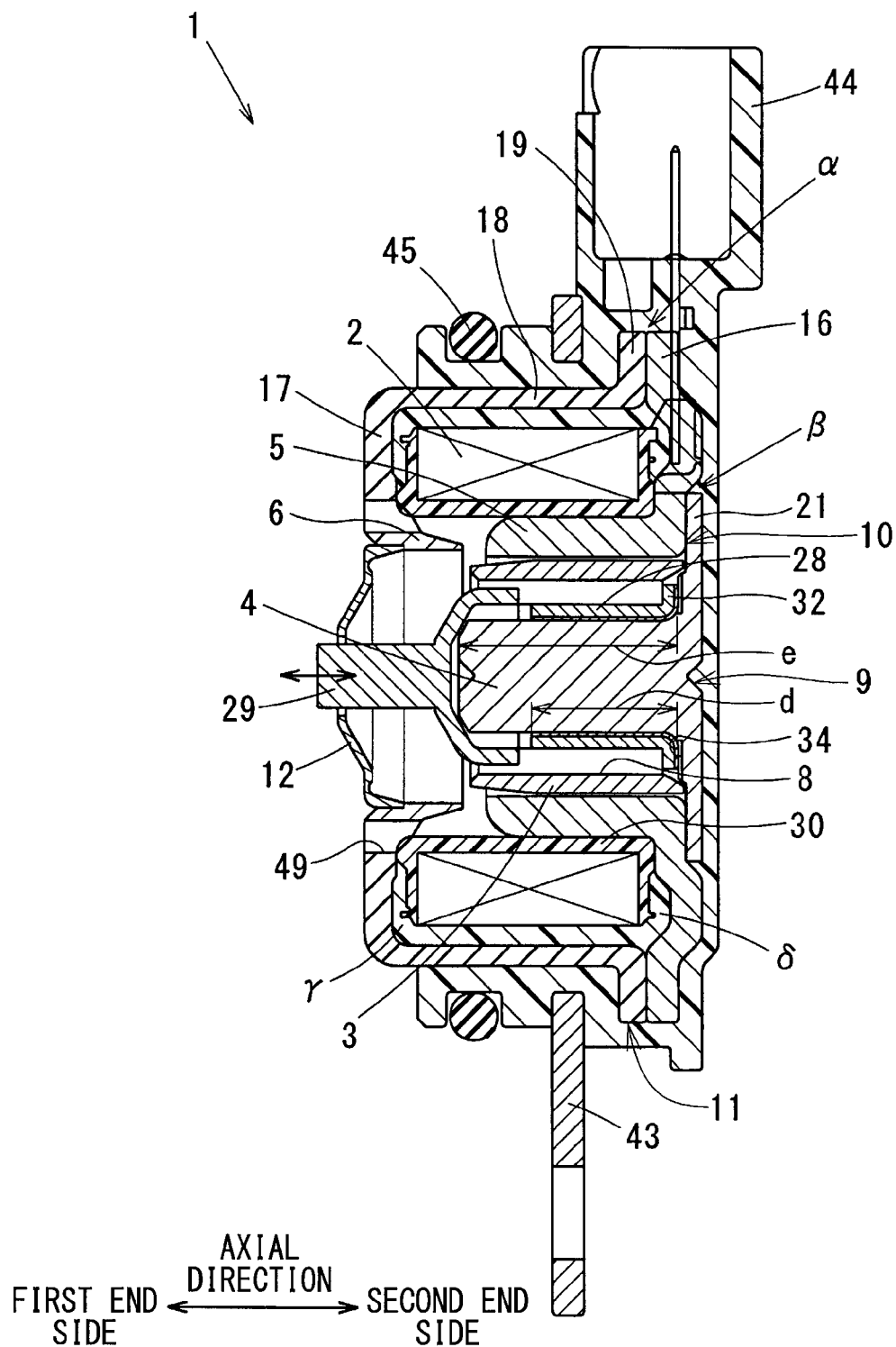
FIG. 4 is a sectional view showing a length in an axial direction which relates to a magnetic flux received and transmitted between a first stator core and a movable core.

A first area is an area in the inner periphery surface of the movable core 3 where the magnetic flux can be received and transmitted between the inner periphery surface of the movable core 3 and the outer periphery surface of the first stator core 4 in the radial direction. A length of the first area in the axial direction is referred to as a first length d. A second area is an area in the outer periphery surface of the first stator core 4 where the magnetic flux can be received and transmitted between the outer periphery surface of the first stator core 4 and the inner periphery surface of the movable core 3 in the radial direction. A length of the second area in the axial direction is referred to as a second length e. As shown in FIG. 4, the first length d is less than the second length e. Further, the first length d is substantially equal to a length of the bearing in the axial direction.

The bearing 28 includes a third flange portion 32 which outwardly extends from a second end side of the bearing 28 in the axial direction. The third flange portion 32 limits a movement of the movable core 3 toward the second end side of the axial direction by being in contact with a second inner-periphery portion 33 of the second flange portion 21. The third flange portion 32 includes a first end part that is placed at a first end side of the third flange portion 32 and is made of magnetic material, and a second end part that is placed at a second end side of the third flange portion 32 and is made of non-magnetic material. The third flange portion 32 further includes an abutting surface 32b that is made of non-magnetic material and is directly in contact with the second inner-periphery portion 33.

Figure 5A:
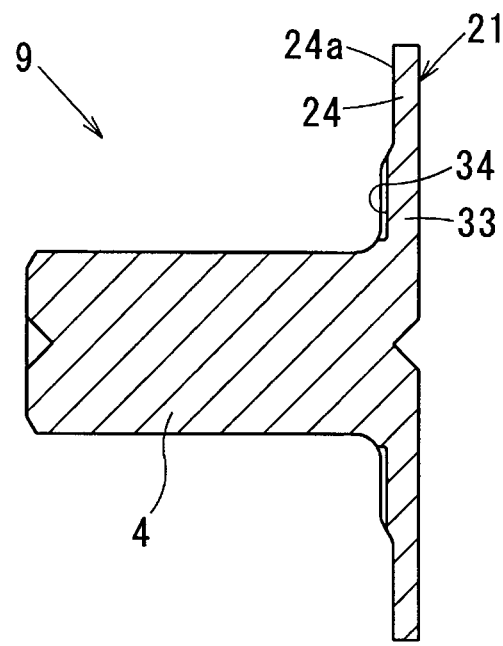
FIG. 5A is a sectional view showing a first magnetic body.
Figure 5B:
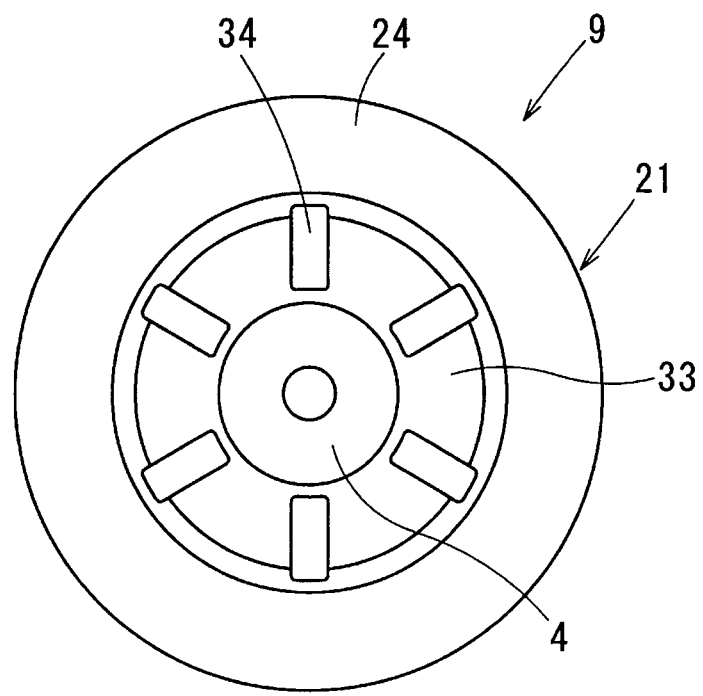
FIG. 5B is a front view showing the first magnetic body.

As shown in FIG. 5, second introducing passages 34 are provided in a surface of a first end side of the second inner-periphery portion 33 in the axial direction as grooves through which the fluid is introduced between an inner periphery of the third flange portion 32 and an outer periphery of the third flange portion 32. According to the present embodiment, the second introducing passages 34 are provided around an axial center of the linear solenoid 1 at a 60-degrees interval. Further, the second introducing passages 34 are radially placed.

The output member 29 that is made of non-magnetic material is fixed to the movable core 3, and moves together with the movable core 3 toward a first end side of the axial direction to outputs the thrust. When the output member 29 receives a recovery force from an external device, the output member 29 is moved together with the movable core 3 toward the second end side of the axial direction.

The output member 29 includes a fixed portion 36 and a shaft portion 37. The fixed portion 36 is a cylindrical shape and is fixed to the movable core 3 to be concentric with the movable core 3. The shaft portion 37 is a column shape and extends toward the first end side of the axial direction.

The inner periphery of the movable core 3 includes a step surface at the first end side of the movable core 3 in the axial direction. A diameter of the step surface is greater than a diameter of a common part of the inner periphery. In this case, the common part of the inner periphery is a part of the inner periphery other than the step surface. The fixed portion 36 is inserted into an area including the step surface and is fixed to the movable core 3. The bearing 28 is inserted into an area including the common part and is fixed to the movable core 3. As shown in FIG. 2A, a gap f is generated between the bearing 28 and the fixed portion 36. The gap f communicates with the first introducing passage 8.

An opening 38 is formed by the cover portion 13 such that the shaft portion 37 penetrating the opening 38 in the axial direction. Therefore, the shaft portion 37 outputs the thrust to external devices.

The shaft portion 37 has a diameter less than a diameter of the fixed portion 36. The shaft portion 37 and the fixed portion 36 are seamlessly bonded to each other via a taper portion 39. The taper portion 39 expanses its diameter toward the second end side of the axial direction. A first end side of the first stator core 4 relatively moves with respect to an inner periphery of the fixed portion 36. The first end side of the first stator core 4 is chamfered to have a taper shape. Even though the movable core 3 and the output member 29 moves to positions most close to the second end side of the first stator core 4, an inner periphery of the taper portion 39 are not in contact with the first stator core 4.

The bobbin 30 is a member made of resin and is wound by the coil 2. The bobbin 30 includes a second cylindrical portion 40, a fourth flange portion 41a, and a fifth flange portion 41b.

The second cylindrical portion 40 is placed at a position outside of both the second stator core 5 and the third stator core 6. The second cylindrical portion 40 is wound by the coil 2. The fourth flange portion 41a and the fifth flange portion 41b outwardly extend from a first end side of the second cylindrical portion 40 and a second of the second cylindrical portion 40, respectively, so as to define a coil area where the coil 2 is wound. The linear solenoid 1 includes a first end seal γ and a second end seal δ which protect the coil 2 from the fluid entering the linear solenoid 1.

Figure 6:
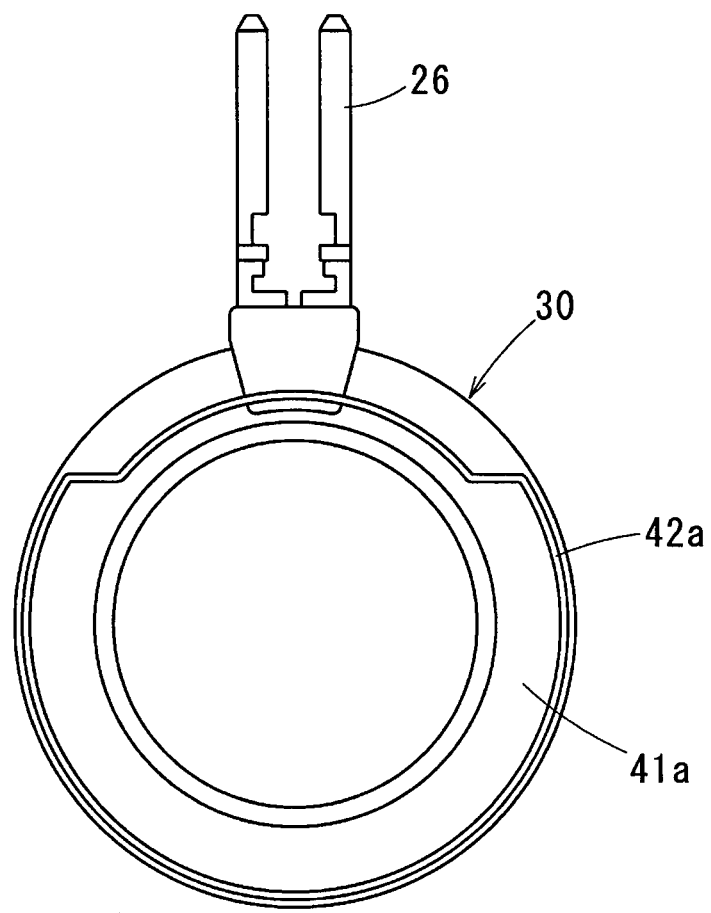
FIG. 6 is a front view showing a bobbin and a terminal.

The first end seal γ is provided to surround an axial center of the coil 2 at a first end side of the fourth flange portion 41a in the axial direction. As shown in FIG. 6, a first protrusion 42a that is made of resin and has a ring shape surrounds the axial center of the coil 2 at a surface of the first end side of the fourth flange portion 41a. The first end seal γ is provided by being solidified after being melted according to a melting resin at the first protrusion 42a.

The second end seal δ is provided to surround the axial center of the coil 2 at a second end side of the fifth flange portion 41b in the axial direction. A second protrusion 42b that is made of resin and has a ring shape surrounds the axial center of the coil 2 at a surface of the second end side of the fifth flange portion 41b. The second end seal δ is provided by being solidified after being melted according to a melting resin at the second protrusion 42b.

A manufacturing method of the linear solenoid 1 includes an injection molding step which injects a melting resin and molds the coil 2, the first magnetic body 9, the second magnetic body 10, the third magnetic body 11, the bobbin 30, and an attachment bracket 43. Further, the first end seal γ, the second end seal δ, a connector 44, and a groove receiving an O-ring 45 are formed by the melting resin injected in the injection molding step.

As shown in FIG. 3, an injection opening (not shown) of the melting resin in the injection molding step is placed at a position in an area g that is opposite to a second end side of the first magnetic body 9.

The second end yoke 16 has a shape that does not interfere with the second protrusion 42b. For example, the second end yoke 16 is not in contact with the second protrusion 42b. The second end yoke 16 further includes an intermediate portion 46 placed between the first inner-periphery portion 23 and the first outer-periphery portion 20. The intermediate portion 46 extends toward the second end side of the axial direction. As shown in FIG. 3, the intermediate portion 46 and the fifth flange portion 41b form a space 47 into which the second protrusion 42b protrudes. The melting resin is filled in the space 47.

Figure 7:
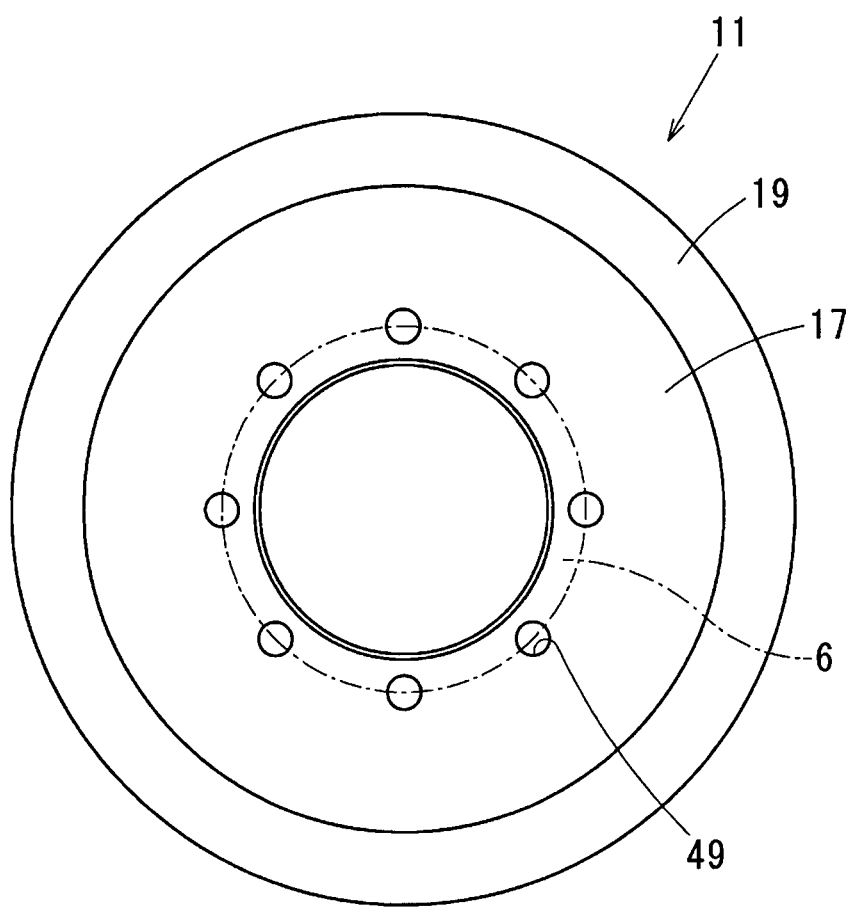
FIG. 7 is a front view showing a third magnetic body.

The linear solenoid 1 further includes a penetrating hole 49 that penetrates the third stator core 6. The penetrating hole 49 communicates an interior of the linear solenoid 1 with an exterior of the linear solenoid 1. The penetrating hole 49 is opened at a position of the linear solenoid 1 outward of an inner-peripheral wall 6a of the third stator core 6. According to the present embodiment, the penetrating hole 49 is parallel to the axial center of the linear solenoid 1. Further, a plurality of the penetrating holes 49 is provided around the axial center of the coil 2. As shown in FIG. 7, for example, the penetrating holes 49 may be provided around the axial center of the coil 2 at a 45-degrees interval.

Figure 8:
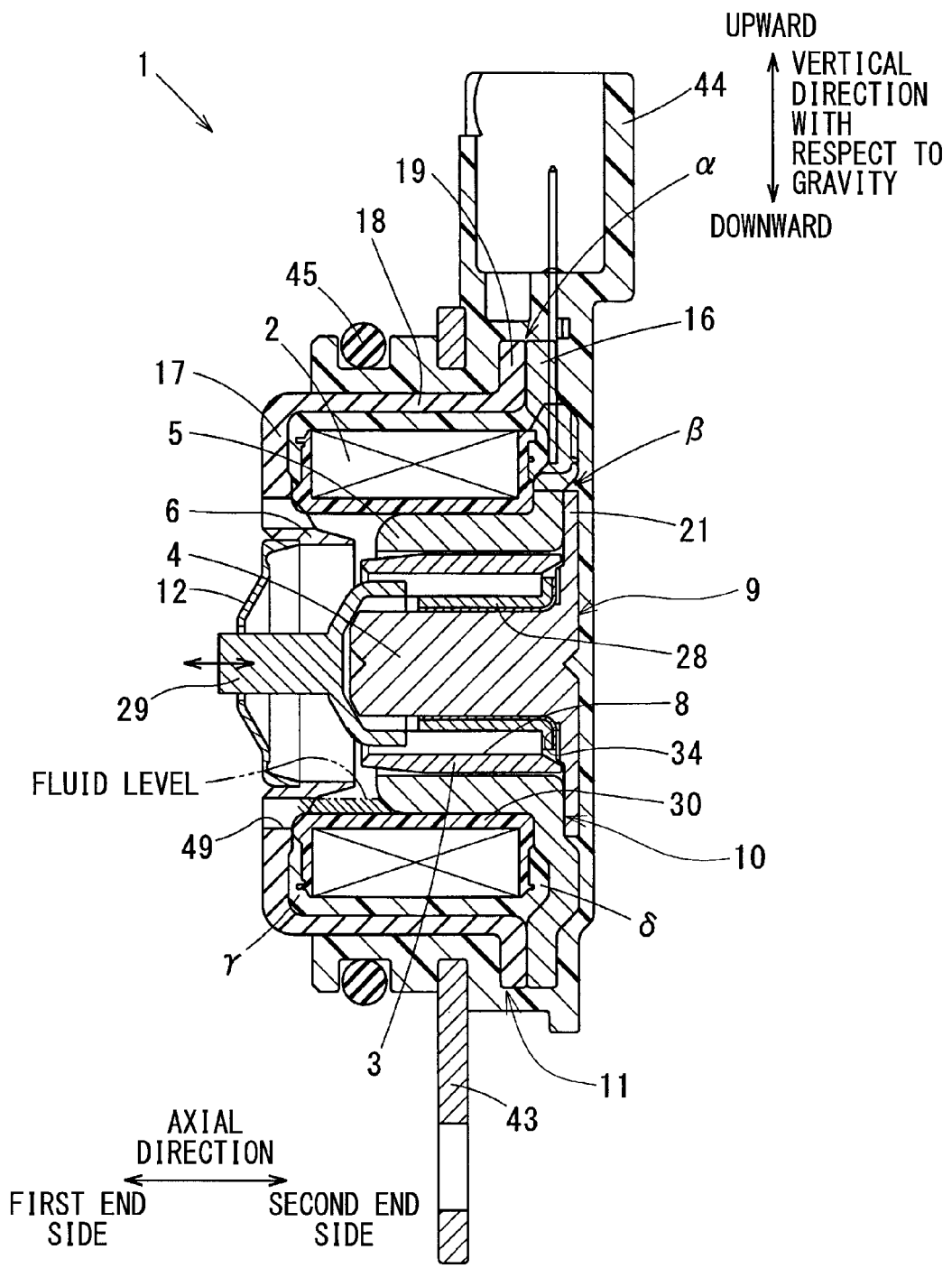
FIG. 8 is a diagram showing a fluid level in the linear solenoid.

The linear solenoid 1 is mounted to the vehicle such that the axial direction is substantially parallel to a horizontal direction. In this case, the connector 44 extends upward in a vertical direction with respect to gravity, and the attachment bracket 43 extends downward in the vertical direction with respect to gravity. Thus, as shown in FIG. 8, a fluid level in the linear solenoid 1 is controlled to be lower than the inner-peripheral wall 6a of the third stator core 6.

In the linear solenoid 1, when the coil 2 is energized, the magnetic flux is received and transmitted in the radial direction between the first stator core 4, the second stator core 5, and the movable core 3. Further, the magnetic flus is received and transmitted in the radial direction between the movable core 3 and the third stator core 6, and the movable core 3 is attracted and moved toward the first end side of the axial direction. Thus, the linear solenoid 1 outputs the thrust in the axial direction.

According to the present embodiment, the linear solenoid 1 includes the movable core 3 having a cylindrical shape, and the first stator core 4 and the second stator core 5 which are placed at positions inward of the movable core 3 and outward of the movable core 3, respectively. The magnetic flux is received and transmitted in the radial direction from both the first stator core 4 and the second stator core 5. The third stator core 6 is a magnetic portion and is placed at a position of the first end side in the axial direction with respect to the second stator core 5 such that the third stator core 6 is not in contact with the second stator core 5. The third stator core 6 magnetically attracts the movable core 3 toward the first end side of the movable core 3 into the inner periphery of the third stator core 6. The cover 12 is provided to block the inner-periphery opening of the first end side of the third stator core 6 in the axial direction. In the linear solenoid 1, the inner diameter a of the third stator core 6 is greater than the inner diameter b of the second stator core 5.

When the first stator core 4, the second stator core 5, and the third stator core 6 are placed in the inner periphery of the coil 2, the jig 15 is inserted from the inner-periphery opening of the first end side of the third stator core 6 into the third stator core 6 to directly position the first stator core 4, the second stator core 5, and the third stator core 6 in the radial direction. Therefore, a side force generated by an axis deviation between the first stator core 4, the second stator core 5, and the third stator core 6 can be reduced. In this case, the side force is an attractive force generated between the movable core, the first stator core, the second stator core, and the third stator core, in the radial direction.

The first R/T mechanism α is provided to receive and transmit the magnetic flux by making the second end yoke 16 of the second magnetic body 10 be in contact with the first flange portion 19 of the third magnetic body 11. Specifically, the first R/T mechanism α receives and transmits the magnetic flux by making the first outer-periphery surface 20a be in surface contact with the flange surface 19b.

Therefore, since an area for receiving and transmitting the magnetic flux between the second magnetic body 10 and the third magnetic body 11 can be sufficiently ensured, the magnetic attractive force can be ensured by reducing a magnetic resistance.

The second R/T mechanism β is provided to receive and transmit the magnetic flux by making the second flange portion 21 of the first magnetic body 9 be in contact with the second end yoke 16 of the second magnetic body 10. Specifically, the second R/T mechanism β receives and transmits the magnetic flux by making the second outer-periphery surface 24a be in surface contact with the inner-periphery surface 2b.

Therefore, since an area for receiving and transmitting the magnetic flux between the first magnetic body 9 and the second magnetic body 10 can be sufficiently ensured, the magnetic attractive force can be ensured by reducing a magnetic resistance.

The first R/T mechanism α is placed at the first end side of the axial direction of the second R/T mechanism β.

Therefore, a size of the linear solenoid 1 can be reduced in the axial direction. The second R/T mechanism β is necessary to be placed at a position adjacent to the second end side of the coil 2. The first R/T mechanism α can be placed at one of a position outward of the coil 2 and a position inward of the coil 2. Since the first R/T mechanism α is placed at the first end side of the axial direction of the second R/T mechanism β, the size of the linear solenoid 1 can be reduced in the axial direction.

The injection opening of the melting resin in the injection molding step of the linear solenoid 1 is placed at a position in an area g that is opposite to the second end side of the first magnetic body 9. Further, the injection opening is placed at a position adjacent to a second end side of the second R/T mechanism β in the axial direction.

Thus, the first outer-periphery surface 20a can be surely in surface contact with the flange surface 19b according to an injection pressure of the melting resin such that the first outer-periphery surface 20a is fixed to the flange surface 19b, and the second outer-periphery surface 24a can be surely in surface contact with the inner-periphery surface 23b according to an injection pressure of the melting resin such that the second outer-periphery surface 24a is fixed to the inner-periphery surface 23b. It is unnecessary to provide specified positions for the above surfaces to meet each other according to the first R/T mechanism α and the second R/T mechanism β.

A configuration of the linear solenoid 1 is not limited to the present embodiment, various modifications can be applied.

According to the present embodiment, the first stator core 4 slidably supports the movable core 3 from the inner periphery of the movable core 3. However, the second stator core 5 may slidably support the movable core 3 from the outer periphery of the movable core 3. Alternatively, the second stator core 5 may slidably support the output member 29.

According to the present embodiment, the second introducing passages 34 are provided in the second flange portion 21 of the first magnetic body 9. However, the second introducing passages 34 may be provided in the third flange portion 32 of the bearing 28. Alternatively, the second introducing passages 34 may be provided in both the second flange portion 21 and the third flange portion 32.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A linear solenoid outputting a thrust in an axial direction using a magnetic flux generated according to an energization of a coil, the linear solenoid comprising:
   a movable core including a magnetic portion having a cylindrical shape, the movable core placed in an inner periphery of the coil and being movable with respect to an axial direction concentric with the coil;
   a first stator core being made of magnetic material, the first stator core placed at a position inside of an inner periphery of the movable core, the first stator core receiving and transmitting the magnetic flux in a radial direction of the movable core;
   a second stator core corresponding to a magnetic portion having a cylindrical shape, the second stator core placed at a position outside of an outer periphery of the movable core such that the movable core is interposed between the first stator core and the second stator core, the second stator core receiving and transmitting the magnetic flux in the radial direction of the movable core; and
   a third stator core corresponding to a magnetic portion having a cylindrical shape, the third stator core placed at a position of the first end side in the axial direction with respect to the second stator core such that the third stator core is not in contact with the second stator core, the third stator core magnetically attracting the movable core toward the first end side of the movable core into the inner periphery of the third stator core, the third stator core including an inner-periphery opening at a first end side in the axial direction where the inner-periphery opening is blocked by a cover, wherein
   the third stator core has an inner diameter that is greater than an inner diameter of the second stator core.

2. The linear solenoid according to claim 1, further comprising:
   a first receiving and transmitting mechanism making a first magnetic portion provided integrally with the second stator core be in contact with a second magnetic portion provided integrally with the third stator core, the first receiving and transmitting mechanism receiving and transmitting the magnetic flux between the first magnetic portion and the second magnetic portion, wherein
   the first magnetic portion includes a first surface perpendicular to the axial direction,
   the second magnetic portion includes a second surface perpendicular to the axial direction, and
   the first receiving and transmitting mechanism receives and transmits the magnetic flux by making the first surface be in surface contact with the second surface.

3. The linear solenoid according to claim 1, further comprising:
   a second receiving and transmitting mechanism making a third magnetic portion provided integrally with the first stator core be in contact with the fourth magnetic portion provided integrally with the second stator core, the second receiving and transmitting mechanism receiving and transmitting the magnetic flux between the third magnetic portion and the fourth magnetic portion, wherein the third magnetic portion includes a third surface perpendicular to the axial direction, the fourth magnetic portion includes a fourth surface perpendicular to the axial direction, and the second receiving and transmitting mechanism receives and transmits the magnetic flux by making the third surface be in surface contact with the fourth surface.

4. The linear solenoid according to claim 1, further comprising:

a first receiving and transmitting mechanism making a first magnetic portion provided integrally with the second stator core be in contact with a second magnetic portion provided integrally with the third stator core, the first receiving and transmitting mechanism receiving and transmitting the magnetic flux between the first magnetic portion and the second magnetic portion; and a second receiving and transmitting mechanism making a third magnetic portion provided integrally with the first stator core be in contact with the fourth magnetic portion provided integrally with the second stator core, the second receiving and transmitting mechanism receiving and transmitting the magnetic flux between the third magnetic portion and the fourth magnetic portion, wherein the first magnetic portion includes a first surface perpendicular to the axial direction, the second magnetic portion includes a second surface perpendicular to the axial direction, the first receiving and transmitting mechanism receives and transmits the magnetic flux by making the first surface be in surface contact with the second surface, the third magnetic portion includes a third surface perpendicular to the axial direction, the fourth magnetic portion includes a fourth surface perpendicular to the axial direction, the second receiving and transmitting mechanism receives and transmits the magnetic flux by making the third surface be in surface contact with the fourth surface, and the first receiving and transmitting mechanism is placed at a first end side of the axial direction of the second receiving and transmitting mechanism.

5. The linear solenoid according to claim 1, further comprising:

a jig inserted from the inner-periphery opening into the third stator core to directly position the first stator core, the second stator core, and the third stator core in the radial direction.

6. A manufacturing method of the linear solenoid according to claim 4, comprising:

injection molding the coil, a first magnetic body including the first stator core, a second magnetic body including the second stator core, and a third magnetic body including the third stator core, wherein the injection molding includes
injecting a melting resin, and
molding the coil, the first magnetic body, the second magnetic body, and
the third magnetic body, and in the injection molding step, an injection opening of the melting resin is placed at a position in an area that is opposite to a second end side of the first magnetic body and is placed at a position adjacent to a second end side of the second receiving and transmitting mechanism in the axial direction.

* * * * *